INVENTOR.
FRANCIS J. SCHANIEL
BY
LIONEL V. TEFFT
Attorney

INVENTOR.
FRANCIS J. SCHANIEL
BY LIONEL V. TEFFT
Attorney

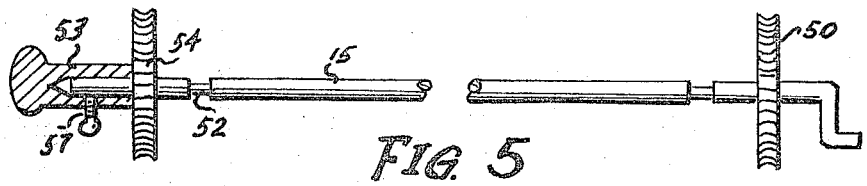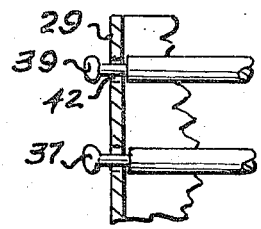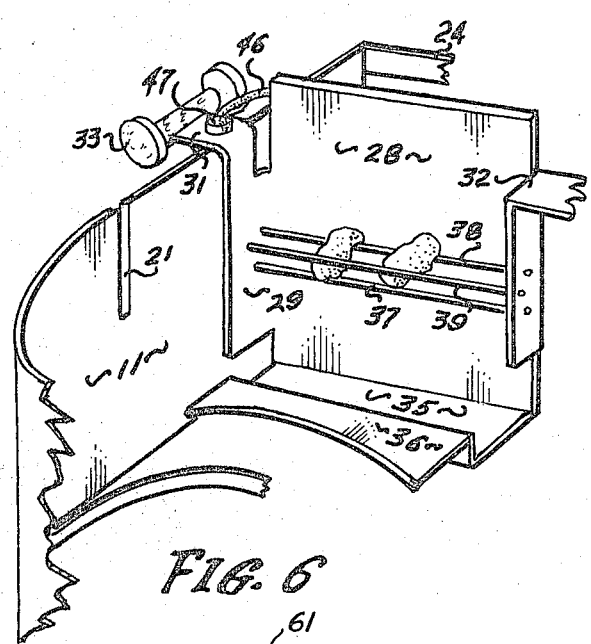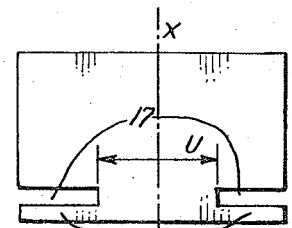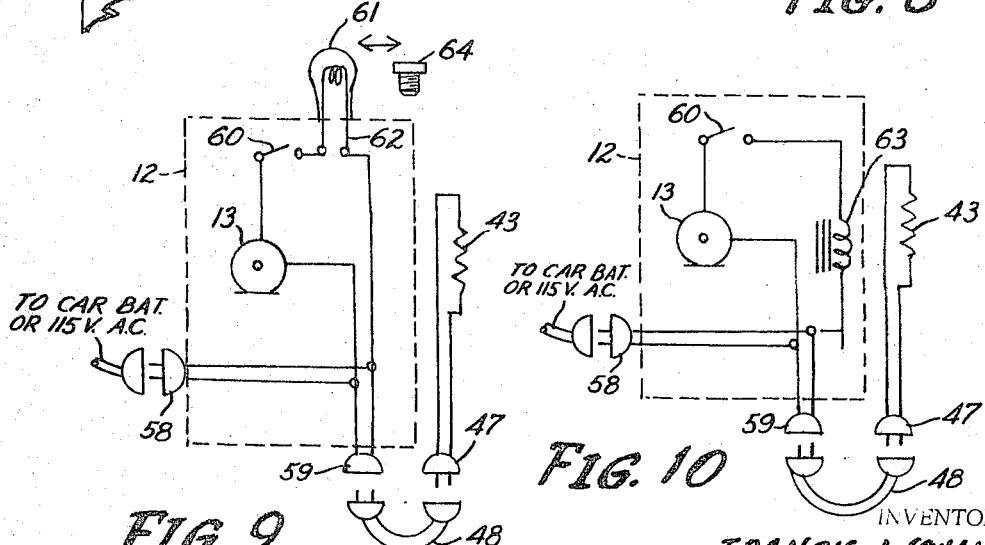

United States Patent Office 3,296,955
Patented Jan. 10, 1967

3,296,955
PORTABLE CHARCOAL-ELECTRIC GRILL
Francis J. Schaniel, 1825 Shoreland Drive, Apt. 113, Alameda, Calif. 94501
Substituted for abandoned application Ser. No. 172,920, Feb. 13, 1962. This application Sept. 3, 1963, Ser. No. 309,366
5 Claims. (Cl. 99—421)

This invention relates generally to portable grills or barbecue apparatus and particularly to a device in which a vertically disposed combined charcoal and electric firebox is located laterally with respect to the rotating spitrod.

One of the main objects of the invention is to provide a portable grill which can be operated by a battery drive and charcoal when used outdoors and by utility power when used in the house.

Another object of the invention is to provide a portable grill wherein the firebox may be moved laterally with respect to a rotating spitrod disposed above a removable juice pan.

Another object of the invention is in the provision of a laterally movable, vertically disposed firebox that is adjustable to either charcoal or electric use.

Still another object of the invention is to provide a barbecue set having a spitrod surrounded section and a slidably mounted firebox, either charcoal or electric.

Yet another object of the invention is to provide a laterally movable, vertically displaceable firebox that can be turned to either charcoal or electric heating position with respect to the rotating spit.

A further object of the invention is in the provision of a portable grill in which the surrounded rotating spitrod is disposed laterally with respect to the firebox so that the drippings are caught in a pan and removed as desired.

A still further object of the invention is to provide a type of portable grill in which the drippings are readily caught, and the ashes quickly removable by vertical displacement of a laterally slidable firebox.

Another object of the invention lies in the provision of a dual purpose electric driving means whereby both 115 v. A.C. and 12 v. D.C. power can be used for rotating the spitrod.

Figure 1:
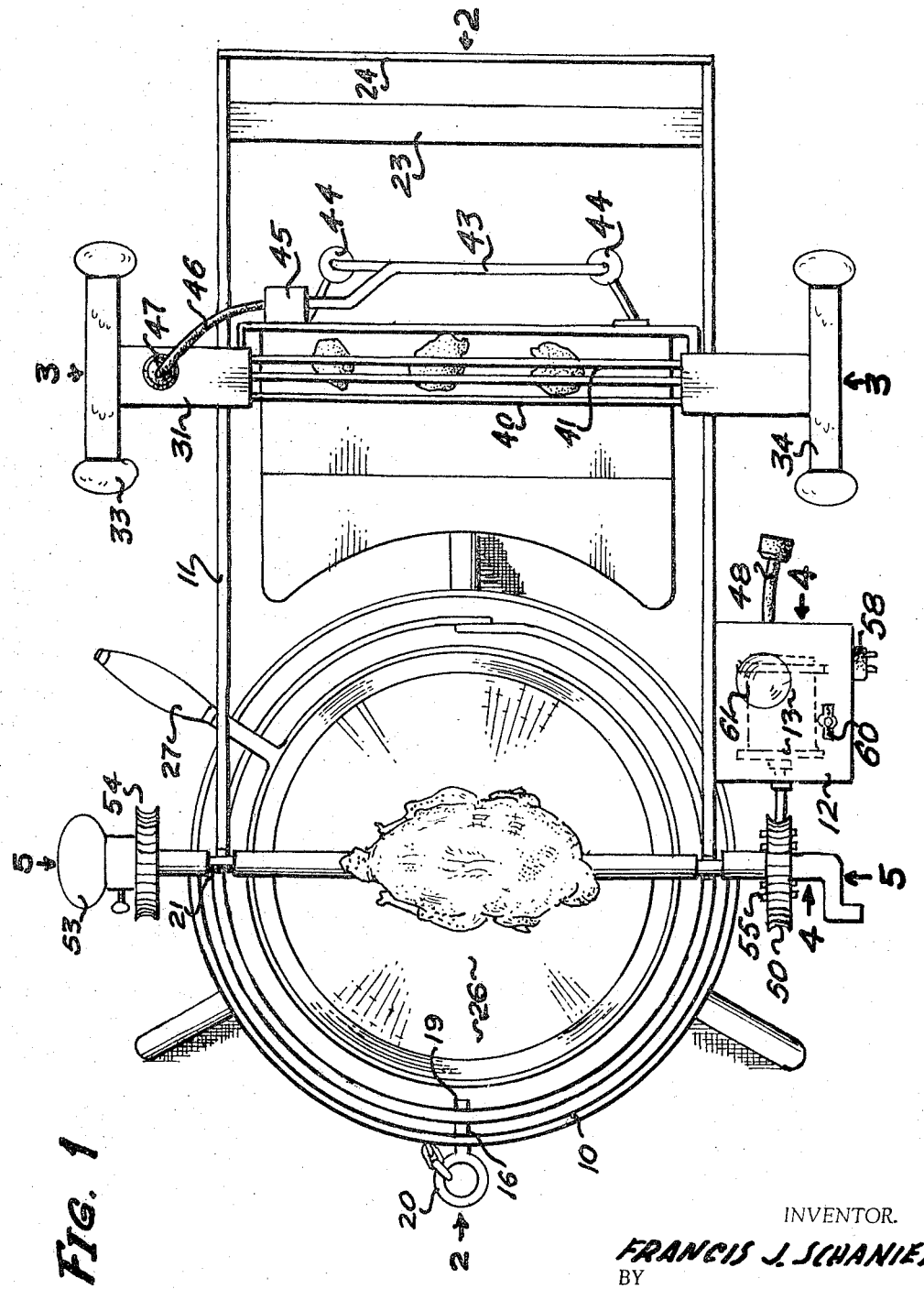
Figure 2:
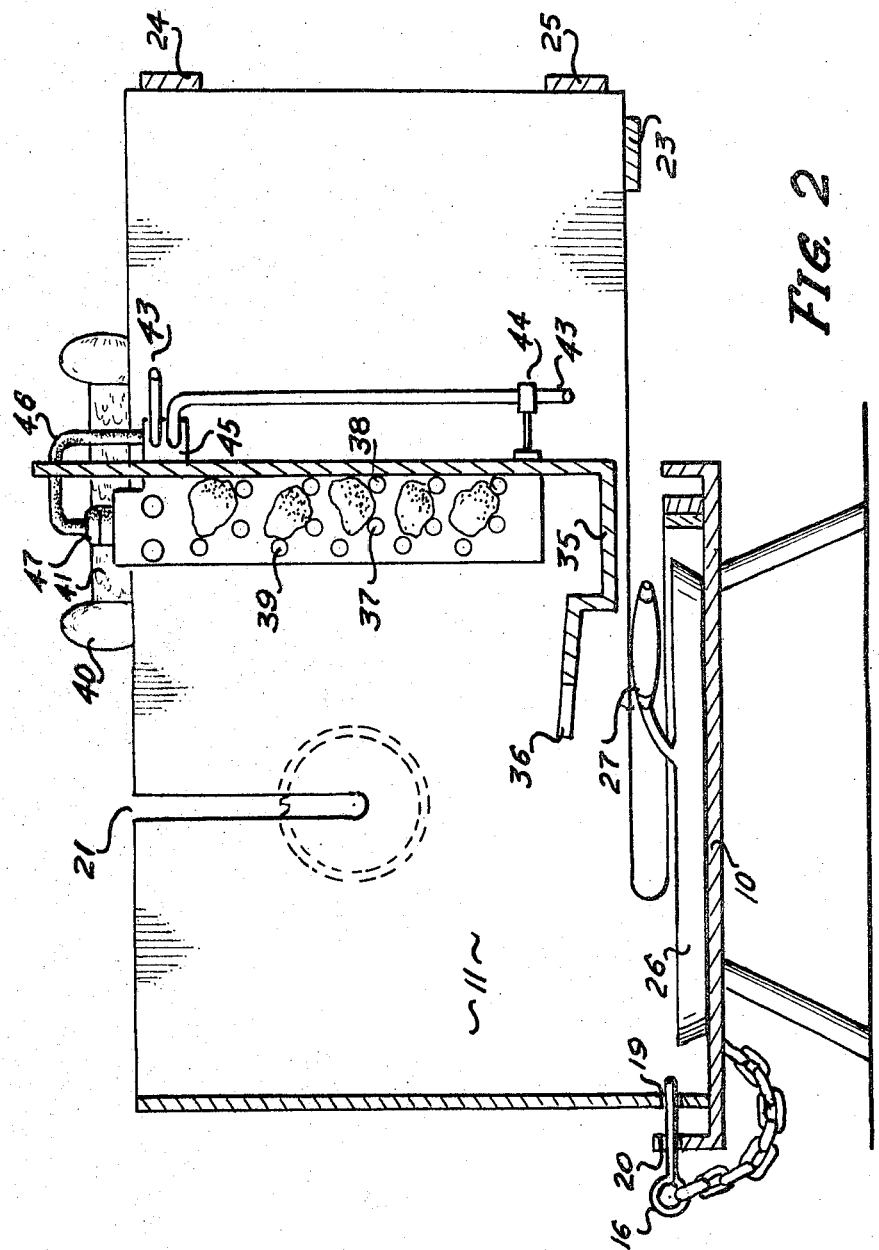
Figure 3:
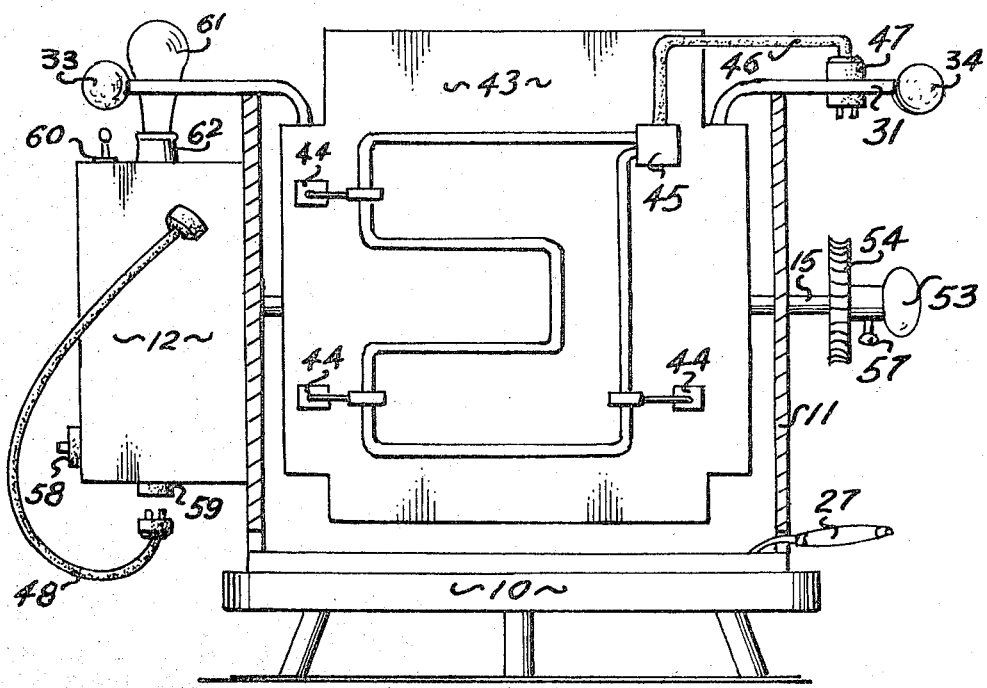
Figure 4:
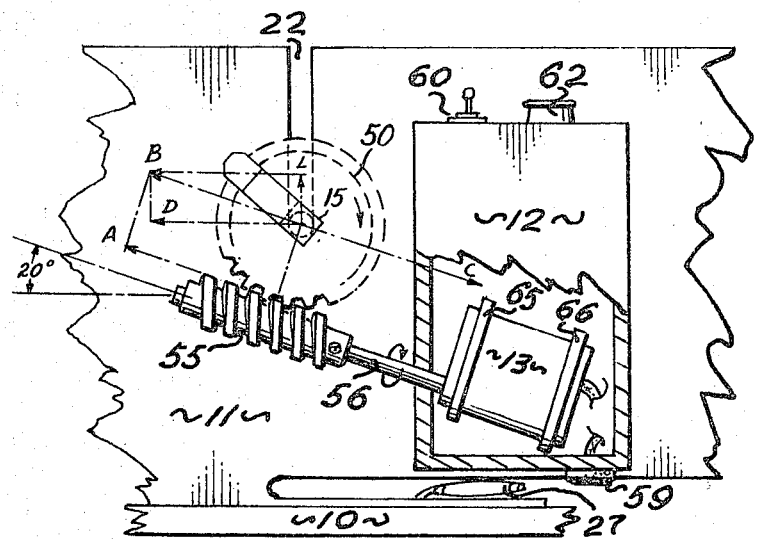

These and other objects and advantages of the present invention will become apparent to those skilled in the art upon consideration of the following detailed description of the preferred embodiment thereof, reference being had to the accompanying drawings, wherein:

FIGURE 1 is a plan view of the rotisserie;
FIGURE 2 is a cross-sectional elevational view taken on the line 2—2 of FIGURE 1;
FIGURE 3 is a sectional view taken on the line 3—3 of FIGURE 1;
FIGURE 4 is an enlarged elevational view taken on the line 4—4 of FIGURE 1, showing the electric driving unit and the driving mechanism;
FIGURE 5 is a sectional view taken on the line 5—5 of FIGURE 1;
FIGURE 6 is an axonometric view inside the barbecuing space showing the charcoal side of the firebox, with one charcoal receptacle only, supported by part of the casing;
FIGURE 7 is a sectional view taken on the line 7—7 in FIGURE 6;
FIGURE 8 is a detail view, showing the casing in an unfolded state;
FIGURES 9 and 10 are detailed wiring diagrams, showing two methods of energizing the electric driving unit, one using a car battery, and the other using utility power, and including the hook-up of the electric heating element.

The rotisserie consists basically of four independent parts (shown in FIGURES 1, 2 and 3):
Pan-like base 10 with three legs;
Casing 11 with attached wiring box 12 and electric driving unit 13 with gear;
Combined electric-charcoal vertical firebox 14; and rotatable spitrod 15.

The pan-like base 10 has three legs and is made of iron and has attached to it by a chain the plug 16 which fits into a hole 20.

The casing 11 may be made from one sheet metal rectangle (FIGURE 8) by cutting away two narrow portions 17 parallel to and closely adjacent the bottom edge of the rectangle, symmetrical to axis X in FIGURE 8, and leaving an uncut part of distance $u$ approximately equal to one-half of the circumference of the pan-like base 10 measured on a horizontal plane. The resulting shape is then bent along the axis X into a U-shaped form. The bottom narrow strips 18 are further bent and firmly joined in an overlapping manner thus forming with the bottom of the uncut part a cylindrical body fitting into and resting with its continuous bottom edge upon the pan-like base. This procedure could be simplified by simply making two cuts from each side at the bottom of the rectangle and parallel with the bottom edge, leaving an uncut part as before, thus avoiding any waste of material and this would be the simplest way to manufacture the casing; the first described method was chosen in order to make clearer drawings.

Two holes 19 and 20 are drilled into the casing, and the vertical cylindrical wall of the base, respectively, so that the plug 16 can be inserted through them, thus preventing the casing from tipping clockwise out of the base due to the weight of the firebox 14. Two vertical slots 21 and 22 are provided in the walls of the casing, the bottom edges of said slots acting as bearings for a rotatable spitrod insertable from the top. For reinforcing purposes, three metal strips 23, 24 and 25 are welded with their ends to the parallel ends of the casing, which may be made of stainless steel or sheet metal covered inside with white, glossy, and preferably heat resistant enamel. Additional reinforcing profile members may be added, particularly in the slot area if necessary. A wiring box 12 and an electrical driving unit 13 with inclined output shaft are mounted on the outside of the casing (see FIGURE 4, also more details later in the text). A frying pan 26 with flat handle 27, slightly bent if necessary, rests on the base 10 with said handle protruding outside and positioned above the upper edge of the base and of the cylindrical part of the casing and under the bottom edge of one of the parallel walls of said casing. This assures easy and cool manipulation of the frying pan, which can be moved by swinging the handle inside (shown by arrow), and lifting when firebox is far enough at the open end of the casing. The frying pan can be kept all the time in horizontal position during this operation, preventing the juice from spilling out.

The firebox, shown in FIGURE 6, is made from one sheet of heavy duty stainless steel, and has a main vertical plate 28 with two perpendicular and vertical side plates 29 and 30, whose upper parts 31 and 32 are bent at a right angle outwardly. These rest and glide with their bottom surfaces on the upper edges of the parallel walls of the casing 11, taking up the bending moment caused by the weight of the whole firebox including charcoal. Two wooden handles 33 and 34 (FIGURE 1) are fastened at their ends for manipulation and lifting. The botttom part of the main vertical plate 28 is bent at right angles and cut to form a trough-like ash collector 35 and a baffle 36 to prevent ashes from falling into the juice. Several charcoal receptacles, consisting of three horizontal round steel bars each, 37, 38 and 39, fixed in the sidewalls 29 and 30, are arranged vertically one above the other (see FIGURE 2). Although smaller charcoal pieces may be used, the receptacles are designed to hold briquets, and in this respect their cross-sectional geometry (as it appears in FIGURE 2) is critical. The briquets are supported by the two bars 37 and 38, and lean against the main vertical plate 28 on one side, and against bar 39 on the other side. They must stay there even after they get smaller by burning. Furthermore, the receptacles must be vertically close to each other so that a maximum member of briquets can be placed into the firebox yet far enough from each other to permit briquets to slide into position between bars 39 and 37a by mere shaking the firebox in a horizontal position with the charcoal side up. The briquets are simply piled up at random over the bars and then shaken down into position. This is also facilitated by the bars being freely rotatable along their longitudinal axis. Little adjustment may be necessary to put them all behind the bars to form a black wall of maximum surface and removing the surplus. It is estimated that five receptacles with seven briquets each, that is thirty-five briquets, would be equivalent to approximately 2.5 kw. at peak heat output. After some of the briquets get smaller, new ones can be added by hand. They will ignite from the other briquets so that continuous fire can be maintained for any desired time.

When necessary, hot ashes can be disposed of in a safe place by taking the firebox out, tilting it to one side and shaking it. Some horizontal adjustment and addition of briquets after that may be desirable. The horizontal round bars have also another purpose. When properly fixed in the side plates 29 and 30 (see detail of FIGURE 7) they take up elastic deformations of the structure, contributing in this way to its rigidity. They can also rotate in the round sideplate holes 42 when forced to do so by briquets sliding into position when shaking the firebox, making it easier as explained before. Of particular importance are the upper bars. For this purpose two heavier bars 40 and 41 are provided. They are stressed in compression when the firebox is lifted by the handles 33 and 34 in this case, and potatoes can be placed on them for baking, or a trough with liquid. They are not part of the briquet receptacles. All the bars with pre-machined ends are inserted into the holes by bending elastically the plates 29 and 30, whereupon the ends of said bars are flattened out by hammering.

On the other side of the main vertical plate 28 is an electric heating element 43 (see also FIGURES 1, 3) fastened to said plate by brackets 44 allowing thermal expansion of the plate relative to the heating element and vice versa. Care has to be exercised in this respect; otherwise unpredictable forces would build up in the various plates with a sudden release, knocking off ashes into the gravy. Heat resistant terminal strip 45 is mounted on the same side, serving also as additional support point for the electric heating element.

Short high temperature electric cable 46 connects said terminal strip with a male plug 47 fastened through the plate 31. The firebox is drawn in a position to operate on charcoal. For electric use it has to be turned around 180 degrees so that the plug 47 can be electrically connected via cable 48 to the wiring box 12. For both charcoal and electric operation, the firebox slides horizontally in vertical position between the vertical parallel casing walls and the flexible cable 48 must be long enough to allow this movement. Both the charcoal and the electric heating surfaces can be placed within one inch from flat food, as steaks for instance if so desired, under which condition the spitrod does not rotate, of course. The firebox can also be slightly turned around its vertical axis when in place, if the shape of the food makes it desirable. No perforations in the firebox plates, casing or base are necessary because the inherent looseness of the structure lets enough air for combustion pass when charcoal operated, and also warping of the sheet metal parts is minimized in this way.

The rotatable spitrod (see also FIGURES 4 and 5) consists of two detachable parts: a) the rod 15 proper of rectangular cross section 49 bent into a crank at one end and pointed at the other end. A toothed wheel 50 is firmly mounted at the crank end of the rod at a fixed distance from a circular groove 51 which is rotatable on the bottom edge of slot 22 or 21. Another groove 52 is machined into the rod at the other end, at a distance equal to the horizontal distance of the slots 21–22. A round handle 53 forms one piece with the toothed wheel 54, which is identical with the wheel 50. A concentric hole is made in the said piece, of rectangular cross section corresponding to the cross section of the rod 15. The length of the hole is such that if the pointed end of the rod 15 is fully inserted into it, the toothed wheel 54 cannot go further than the distanced from the groove 52. Therefore either toothed wheel 50 or 54 can be engaged with the worm 55 of the inclined output shaft 56, by vertically inserting the spitrod 15 into the slots 21 and 22 of the casing. The width of the slots 21 and 22 is equal to the diameter of the grooves 51 and 52 so that positive guidance is assured when inserting the spitrod, and sidethrust prevented when said spitrod is in place with one of its toothed wheels engaged with the worm.

With fixed distanced, and fixed diameter of the toothed wheels 50 and 54, the relative position of the worm 55 with respect to the bottom of the slots 21 and 22 is critical. This is obvious both from the elevation of FIGURE 4 and the plan view of FIGURE 1. A butterfly screw 57 secures the handle-wheel piece axially on the spitrod. In this way food can be rotated in two different directions, compensating thus for non-uniformity of the heat source and improving the flow of juices inside and outside. Although not shown, removable forks or flat grill box may be fastened on the spitrod to hold the food. With the handle 53–54 slightly displaced axially, the spitrod, with its crank end on the proper side, can be turned manually in case of power failure.

When food is prevented from turning by blockage, for instance by bones suddenly sticking out and jamming with the firebox which may be very close, an audible warning works approximately as follows (see FIGURE 4): when rotation is prevented, the direct current motor slows down, but having a high torque at low speed, will keep turning. An increased tangential force A is established and adding two opposite equal forces B and C parallel with A will not change the equilibrium of the system. Resulting torque caused by A and C is taken up by the jammed food and remaining force B is resolved into D and L as shown in the drawing. D is taken up by the vertical edge of the slot and L lifts the spitrod, disengaging the toothed wheel from the worm, whereupon it sinks again. This repeats itself with a grinding noise amplified by the resonance of the casing, and the cook is thus notified of the trouble. The above sequence of events will happen only when the output shaft 56, which should be made as short as possible, is inclined about 20 degrees, has the proper sense of rotation, and an electric driving unit with high-torque at low speed, is used. The same electric driving unit is mounted in the inclined position by means of two steel straps 65, 66 with their ends welded through the rear wall of the wiring box 12 to the casing 11 or by other conventional means. A single phase A.C. motor, such as presently used with barbecues, might quietly stop and let the food burn, or it might burn itself out unless provided with a fuse or other protection.

Basically, any direct current motor will operate on single phase alternating current because armature and field currents reverse nearly simultaneously, the direction of torque remaining the same. The lower the frequency the better the motor will operate; zero and very low frequencies representing actually direct current conditions. On true A.C. operation, however, the D.C. motor will have a poor Power Factor, and might overheat because of unlaminated magnetic iron core permitting strong A.C. eddy currents to circulate through the low electrical resistance of the thick iron. Therefore a D.C. motor of special design would have to be used, particularly with all magnetic iron laminated. Instead of a bulb as mentioned at the beginning another method of making the motor work on 115 v. A.C. would be to incorporate a different current limiting device such as an inductive ballast, as applied to fluorescent lights, where the gaseous discharge represents quasi-short-circuit conditions. It would limit 115 v. A.C. current, but would allow full low voltage direct current to go through the motor. There are other means of achieving the same result; such as using D.C. and A.C. motors with a common shaft and dual electrical input; or two separate D.C. and A.C. motors alternatively driving one output shaft, or transformer, rectifier, etc.

Should some objections arise enforcing revision of the somewhat unusual electrical setup, it is believed it could be done by people skilled in the art without departing from the true electrical idea of the invention. When operating from a car, the power requirements on the battery are small. For example, a 24 watt, 12 volt motor would draw only about 2 amperes when fully loaded, which rarely would occur with the food fairly well balanced. Conservatively estimating the car battery capacity as 50 ampere-hours, the available time for barbecuing would be about 25 hours. Furthermore the car would arrive at the campsite with a battery probably fully charged and would recharge it again going home. Last but not least, moderate charging and discharging is beneficial to the battery and prolongs its life.

The electrical wiring is shown schematically in FIGURES 9 and 10. When barbecuing on utility power, a main connection is made through male plug 58. A female plug 59 serves for connecting the electric element 43 via cable 48 as explained under "firebox" hereinbefore. Parallel to this high-powered circuit is wired a low-power series combination of: a D.C.-A.C. electric driving unit 13, an on-off switch with maintained contacts 60, and a standard light bulb 61 of prescribed wattage screwed into a standard socket 62 as shown in FIGURE 9. The bulb serves also as illumination as long as the switch 60 is on, and it acts as a current limiting device for the D.C.-A.C. electric driving unit motor. Another solution is shown in FIGURE 10, where the bulb arrangement is replaced by another current limiting device known as an "inductive ballast" 63. When barbecuing on a car battery, a low ampere standard fuse 64 is screwed into the socket 62 instead of the standard bulb. It short-circuits directly the full low voltage of the battery with the D.C.-A.C. elecric driving unit which being designed for this low voltage, operates then in the D.C. mode. The low ampere fuse serves also as a protection for the motor in case the same is accidentally plugged into 115 v. A.C. utility power.

When using the modified circuit of FIGURE 10, the ballast 63, which has high inductive reactance at 60 cycles, but low resistance, will allow low voltage D.C. current through the motor under nearly the full voltage of the battery. In this way direct plugging into 115 v. A.C. or low voltage D.C. source will operate the motor without the use of the bulb or fuse. However, it is more expensive and heavier to do it this way. The sex of the various plugs is carefully chosen, so that under no combination of voltages and disconnections of the cables is there danger of a "hot" electric contact sticking out and causing trouble. When the electric heating element 43 is connected by mistake when operating on a battery, nothing will happen because of the high electrical resistance of said elements against low voltage current.

When cooking, the rotisserie is assembled and operated as follows:

Before connecting the electric heating element or starting the charcoal fire, it is highly advisable to slip a sheet of aluminum foil behind the element or behind the horizontal bars of the charcoal side of the firebox so that said sheet of aluminum is in close contact with the vertical plate 28 and plied over it at the top. This can easily be done because there is nothing in the way. The aluminum foil will reflect useful heat, keep the firebox comparatively cool, and facilitate cleaning up when barbecuing is done. In the case of charcoal broiling, the aluminum sheet should be pulled through, covering the trough 35 and baffle plate 36. The firebox is placed horizontally on the ground, briquets poured over the bars and shaken down behind said bars and neatly arranged to form a coarse, dark wall with excellent radiating properties. Liquid fuel is then poured over the briquets and ignited. It is not recommended that the briquets be ignited while piled up in a mound, because of strong heat concentration which might soften the horizontal steel bars. While the briquets start to burn, which process can be accelerated by a 12 v.-D.C. operated motor fan, the base 10 is firmly established with its legs on the ground and the casing 11 is inserted in the base and secured with plug 16 against tipping as described hereinbefore. Next the frying pan with a little water is put on the base with the handle sticking out as shown. Food is then placed on the spitrod 15 with the detachable-handle-toothed-wheel piece 53-54 off, whereupon the said handle is slipped over the pointed end of the spitrod as far as it will go and secured by screw 57. The spitrod with food is then inserted, holding it on both ends, from the top, to engage either of its toothed wheels 50 or 54 with the worm 55. After, that, the fuse 64 is screwed in the socket 62 and switch 60 is flipped into off position.

When battery power is connected into plug 58, the mechanism is ready to operate. When briquets are hot enough the firebox is lifted by handles 33 and 34 into vertical position, excessive coal dust shaken off, and said firebox inserted in from the top into a position shown on the drawings and horizontally moved along close to the food with a sliding motion on the top of the parallel walls of the casing 11. Switch 60 is then turned on, and cooking starts. Although not shown in the drawings, a heat reflecting cover may be used, and on windy days a steel baffle put vertically in front of the firebox would prevent blowing ashes into the food.

During cooking, after the firebox has been moved slightly away from the food in a horizontal direction, basting can be accomplished by tilting the frying pan with one hand and scooping up the juice with a long handled spoon held in the other hand. When operating on utility power, the procedure is similar, except that a bulb replaces the fuse, and the electric heating element is connected directly via cable 48 into plug 59. The firebox has of course, been turned 180 degrees from the former position. As most cooking operations are done from the top in this version, shorter legs should be used.

While I have shown and described in considerable detail what I believe to be the preferred form of my invention, it will be understood by those skilled in the art that various changes may be made in the several parts without departing from the broad scope of the invention as defined in the following claims.

I claim:
1. A barbecue unit, comprising:
 a portable base having a detachable drip and basting pan thereon;
 an open upper edged detachable casing surrounding said base and having parallel sides extending laterally thereof, said casing having vertical spitrod receiving notches on either side of said base;
 a spitrod disposed in said notches, said spitrod having driving gears on both casing extending ends and capable of manually detachable 180° repositioning;
 a power driven output shaft on said casing having a worm engageable with said spitrod gears irrespective of placement; and
 a vertically disposed charcoal or briquet firebox between the parallel sides of said base and having upper manually graspable handles extending thereover and slideable thereon so as to be physically withdrawn vertically for ash dumping.

2. A device as set forth in claim 1 in which said output shaft is operated by a combined battery and utility drive in one unit.

3. A device as set forth in claim 1 in which said output shaft is inclined at substantially 20°.

4. A device as set forth in claim 1 in which said firebox has a laterally extending ash pan and a series of horizontally and angularly disposed rotatable fuel supporting rods.

5. A device as set forth in claim 1 in which an electrical heating surface is disposed on the back of said firebox for useful purpose when desired.

References Cited by the Examiner

UNITED STATES PATENTS

| | | | |
|---|---|---|---|
| 2,715,870 | 8/1955 | Rutkowski | 126—25 X |
| 2,718,845 | 9/1955 | Dudley | 99—421 |
| 2,815,707 | 12/1957 | Morrow | 99—421 |
| 2,921,175 | 1/1960 | Zaidan. | |
| 2,923,229 | 2/1960 | Halford | 99—339 |
| 3,045,581 | 7/1962 | Bernstein | 99—340 |
| 3,096,706 | 7/1963 | Cardwell | 99—340 |
| 3,106,150 | 10/1963 | Gaeke | 99—340 |
| 3,175,549 | 3/1965 | Bergsten | 99—421 X |

FOREIGN PATENTS 316,124  11/1956  Switzerland.

WALTER A. SCHEEL, *Primary Examiner.*

IRVING BUNEVICH, *Examiner.*

S. P. FISHER, *Assistant Examiner.*